United States Patent
Pistone et al.

(10) Patent No.: US 11,460,366 B2
(45) Date of Patent: Oct. 4, 2022

(54) COUPLER AND METHODS OF USE FOR ASSESSMENT OF REFRIGERATION SYSTEMS

(71) Applicant: ENERGIZER AUTO, INC., St. Louis, MO (US)

(72) Inventors: Kenneth Alan Pistone, Rowlett, TX (US); Vincent Carrbba, Belle Harbor, NY (US)

(73) Assignee: Energizer Auto, Inc., St. Louis, MO (US)

( * ) Notice: Subject to any disclaimer, the term of this patent is extended or adjusted under 35 U.S.C. 154(b) by 220 days.

(21) Appl. No.: 14/790,168

(22) Filed: Jul. 2, 2015

(65) Prior Publication Data

US 2016/0003509 A1    Jan. 7, 2016

Related U.S. Application Data

(60) Provisional application No. 62/021,431, filed on Jul. 7, 2014.

(51) Int. Cl.
*F25D 19/00* (2006.01)
*G01L 19/00* (2006.01)
(Continued)

(52) U.S. Cl.
CPC .......... *G01L 19/0007* (2013.01); *G01K 1/024* (2013.01); *G01K 13/00* (2013.01);
(Continued)

(58) Field of Classification Search
CPC ............. F25B 1/00; F25B 45/00; F25D 19/00
(Continued)

(56) References Cited

U.S. PATENT DOCUMENTS 5,239,865 A    8/1993   Salzer et al.
5,295,360 A *  3/1994   Olds ................... G01N 33/0049
                                                          62/127
(Continued)

FOREIGN PATENT DOCUMENTS

GB      2309786 A      8/1997
WO   2004076943 A1    9/2004
(Continued)

OTHER PUBLICATIONS

Intellectual Property Office Search Report dated Oct. 26, 2015 from corresponding United Kingdom Patent Application No. GB1511688.2, pp. 6.

(Continued)

*Primary Examiner* — Larry L Furdge
*Assistant Examiner* — Alexis K Cox
(74) *Attorney, Agent, or Firm* — Lee & Hayes, P.C.

(57) ABSTRACT

A refrigeration servicing system includes an apparatus and user equipment in electronic communication with the apparatus. The apparatus includes a body having a first end and a second end, wherein a passage extends within the body from the first end to the second end. A recess is formed within the body at the second end. The body comprises an inlet at the first end configured to directly engage with a portion of the refrigeration system, a conduit in fluid communication with the inlet, and a plunger. The conduit and plunger are each positioned in the passage. The apparatus also includes a housing at least partially positioned in the recess and in fluid communication with the conduit. The housing includes a sensor configured to directly contact the fluid and measure a parameter of the fluid. A method of servicing a refrigeration system is also provided.

20 Claims, 10 Drawing Sheets

(51) Int. Cl.
*G01K 1/024* (2021.01)
*G01K 13/00* (2021.01)
*F25B 13/00* (2006.01)
*F25B 45/00* (2006.01)

(52) U.S. Cl.
CPC ...... *G01L 19/0015* (2013.01); *G01L 19/0092* (2013.01); *F25B 13/00* (2013.01); *F25B 45/00* (2013.01); *F25B 2345/006* (2013.01); *F25B 2700/21163* (2013.01); *F25B 2700/21175* (2013.01); *G01K 2205/00* (2013.01)

(58) Field of Classification Search
USPC .......................................... 62/77, 149, 298
See application file for complete search history.

(56) References Cited

U.S. PATENT DOCUMENTS

| | | | |
|---|---|---|---|
| 5,481,481 A | 1/1996 | Frey et al. | |
| 5,820,262 A | 10/1998 | Lechner | |
| 5,889,464 A | 3/1999 | Huang | |
| 5,987,903 A | 11/1999 | Bathla | |
| 6,101,820 A | 8/2000 | Cheballah | |
| 6,334,320 B1 | 1/2002 | Brown et al. | |
| 6,571,566 B1 | 6/2003 | Temple et al. | |
| 7,260,943 B2 | 8/2007 | Carrubba et al. | |
| 8,301,403 B2 | 10/2012 | Weick | |
| 10,982,888 B2* | 4/2021 | Carrubba | F16K 1/308 |
| 2003/0055603 A1 | 3/2003 | Rossi et al. | |
| 2005/0193825 A1 | 9/2005 | Otsuka | |
| 2005/0217285 A1* | 10/2005 | Carrubba | B60H 1/00585 |
| | | | 62/149 |
| 2008/0022701 A1 | 1/2008 | Carrubba | |
| 2009/0041081 A1* | 2/2009 | Warth | G01L 9/0055 |
| | | | 374/143 |
| 2009/0113901 A1 | 5/2009 | Carrubba et al. | |
| 2009/0188263 A1* | 7/2009 | Murray | B60H 1/00585 |
| | | | 62/77 |
| 2009/0205363 A1* | 8/2009 | de Strulle | B08B 7/0014 |
| | | | 62/533 |
| 2010/0089076 A1 | 4/2010 | Schuster et al. | |
| 2010/0126189 A1* | 5/2010 | Soenmez | B64F 5/40 |
| | | | 62/77 |
| 2012/0143528 A1 | 6/2012 | Kates | |
| 2013/0118187 A1* | 5/2013 | Carrubba | F25B 45/00 |
| | | | 62/77 |
| 2014/0260400 A1* | 9/2014 | Lundberg | F25B 45/00 |
| | | | 62/298 |
| 2014/0262130 A1* | 9/2014 | Yenni | G05B 23/0272 |
| | | | 165/11.1 |
| 2015/0241316 A1 | 8/2015 | Ulrich et al. | |
| 2015/0308879 A1 | 10/2015 | Pistone et al. | |

FOREIGN PATENT DOCUMENTS

| | | |
|---|---|---|
| WO | 2009017851 A1 | 2/2009 |
| WO | 2014053195 A1 | 4/2014 |

OTHER PUBLICATIONS

Intellectual Property Search Report dated Oct. 20, 2015, from United Kingdom Patent Application No. GB1507092.3, (4 pages).
Intellectual Property Search Report dated Jun. 20, 2016, from United Kingdom Patent Application No. GB1507092.3, (5 pages).

* cited by examiner

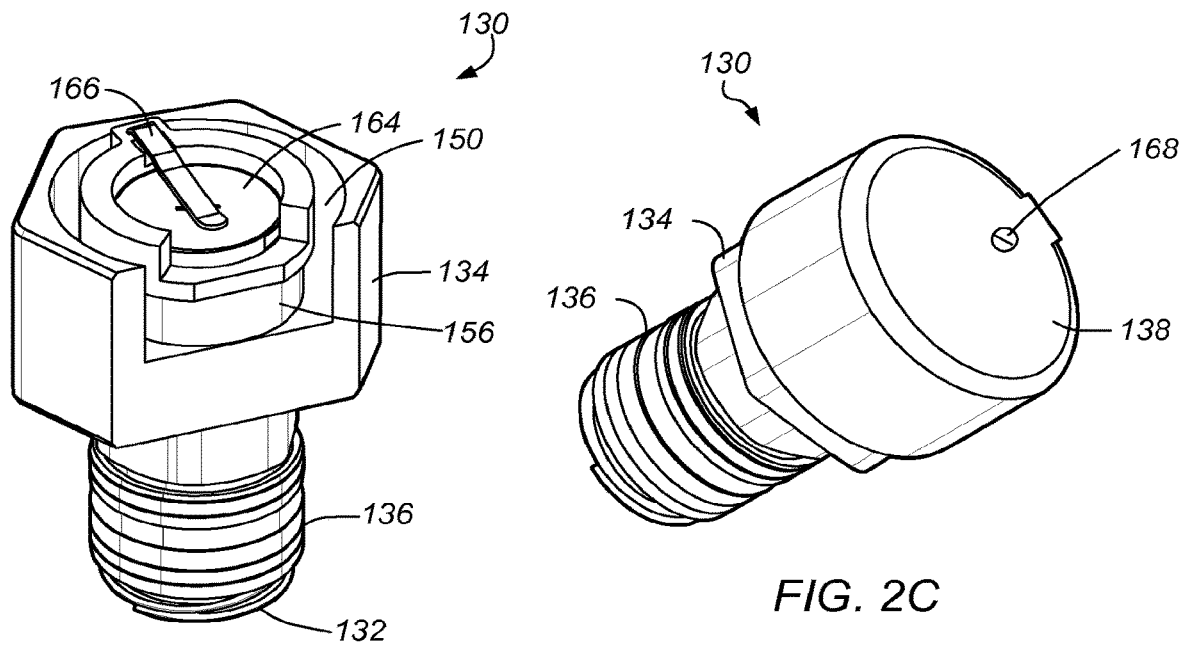
FIG. 2A
FIG. 2C
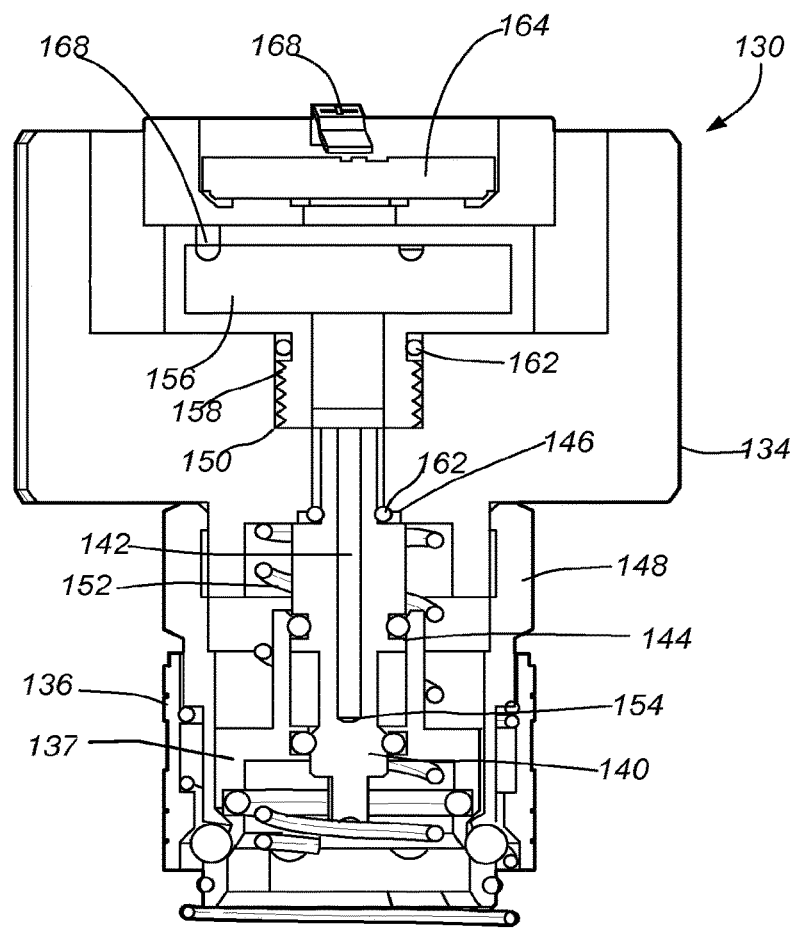
FIG. 2B

COUPLER AND METHODS OF USE FOR ASSESSMENT OF REFRIGERATION SYSTEMS

RELATED APPLICATION

This application claims the benefit of U.S. Provisional Application Ser. No. 62/021,431, filed on Jul. 7, 2014, which is incorporated herein by reference in its entirety.

BACKGROUND

1. Field of the Disclosure

Embodiments of the present disclosure relate to systems, methods and apparatus for fluid delivery. In particular, the present disclosure relates to a coupler and uses thereof for servicing refrigeration systems.

2. Description of Related Art

Refrigeration systems have been relied upon as a principal source of cooling in a variety of applications. Refrigeration systems are found in, for example, vehicles, commercial buildings and residential buildings. Many refrigeration systems (air conditioning systems) use a circulating medium (for example, refrigerant) that absorbs and removes heat from the space to be cooled and subsequently rejects the absorbed heat elsewhere.

Refrigeration systems operate based on principles of the Reversed Carnot Cycle, also known as the Vapor-Compression Refrigerant Cycle. The ability to achieve cooling by compressing and expanding a gaseous refrigerant may depend to some degree on the amount of liquid fluid present in the system. The amount of liquid fluid may directly influence the performance of vapor-compression-refrigeration systems. Under charging the system of refrigerant may cause the system to not operate at design set points, risking shortened compressor life, poor cooling performance, and ultimately putting the compressor at risk of mechanical failure. Over charging may cause liquid refrigerant to enter the compressor resulting in damage to the compressor, increased high side pressure putting more load on the compression system resulting in poorer fuel economy along with increased wear on the compressor, higher pressures also can result in exceeding the refrigerant systems pressure safety limits and increasing compressor operating temperatures both resulting in the system turning off and affecting overall cooling performance.

Several factors may adversely affect the amount of refrigerant in the system. For example, the refrigeration system may be subject to significant swings in temperature and frequent thermal cycling due to the action of the system itself and the heat produced by power sources (for example, engines). Under these conditions, joints and fittings may tend to expand and contract, permitting refrigerant to slowly leak out of the system. In another example, the hoses used may be slightly permeable to the refrigerant, which may also permit the refrigerant to slowly leak out of the hoses. Accordingly, maintenance of refrigerant systems may require monitoring the refrigerant level or pressure and periodic re-charging of the refrigerant as indicated.

Charge adequacy may be checked manually by trained service technicians using pressure gauge measurements, temperature measurements, and a pressure to refrigerant temperature relationship chart for the particular refrigerant resident in the system. For vapor-compression-refrigerant systems, which use a thermal expansion valve (TXV) or an electronic expansion valve (EXV), the superheat of the refrigerant entering the compressor may be regulated at a fixed value, while the amount of subcooling of the refrigerant exiting the condenser varies. In most systems, the "subcooling method" may be used as an indicator for charge level. The amount of subcooling is calculated by determining the saturated refrigerant temperature from the refrigerant pressure measured between the outlet of the condenser coil and prior to the expansion device for the refrigerant in use. The saturated refrigerant temperature minus the actual refrigerant temperature measured between the outlet of the condenser coil and prior to the expansion device is determined and compared to a range of acceptance levels of subcooling.

A refrigerant pressure and temperature may be measured between the condenser outlet and prior to the expansion valve. The consumer may then refer to a pressure/temperature relationship chart for the refrigerant in use to determine the saturated refrigerant temperature at the measured pressure. Based on the measured pressure, the amount of cooling actually present at the current operating conditions (for example, outdoor temperature, indoor temperature, humidity, indoor airflow and the like) may be calculated. If the measured amount of cooling lies within the range of acceptable amounts, the system is deemed to be properly charged. If not, the consumer may adjust the refrigerant charge by either adding a quantity of refrigerant to the system or removing a quantity of refrigerant from the system, as appropriate. Methods for determining the refrigerant charge level in an air conditioning system are described in U.S. Pat. No. 5,239,865 to Salzer et al.; U.S. Pat. No. 5,481,481 to Frey et al.; U.S. Pat. No. 5,987,903 to Bathla; U.S. Pat. No. 6,101,820 to Cheballah; and U.S. Pat. No. 6,571,566 to Temple et al., and U.S. Patent Application Publication Nos. 2010/0089076 to Schuster et al. and 2012/0143528 to Kates all of which are incorporated herein by reference.

U.S. Pat. No. 8,301,403 to Weick and U.S. Pat. No. 7,260,943 to Carrubba et al., and U.S. Patent Application Publication Nos. 2008-0022701 to Carrubba et al. and 2009-0113901 to Carrubba et al., all of which are incorporated herein by reference, describe various apparatus that may allow a consumer to measure the refrigerant pressure in an automobile air conditioner and to add refrigerant as needed.

Most of these prior art methods and apparatus provide only a qualitative determination of whether the charge level is below or above acceptable limits or require inputs from multiple sensors, including ambient temperature and humidity sensors, in order to determine refrigerant charge level, which increases the cost and complexity of the system. Many of the prior art apparatus and methods are expensive to maintain, costly, and are not easily used by a do-it-yourself consumer.

There is, therefore, a need for an improved systems and methods of determining a level of fluid in vapor-compression-refrigerant systems and other refrigerant systems. There is also a need for a method of determining a level of fluid in a refrigerant system that is both relatively inexpensive and reliable under a wide range of ambient temperature conditions.

SUMMARY OF THE DISCLOSURE

A coupler and methods of use are described herein. In some embodiments, a coupler for servicing a refrigeration system includes an inlet engageable with a portion of a refrigeration system and a housing coupled to the inlet. The housing may include a temperature component and a pressure component. The temperature component is configured to measure an in situ temperature of a pressurized fluid of the refrigeration system, generate a signal representative of the measured temperature, and transmit the signal representative of the measured temperature. The pressure component is configured to measure an in situ pressure of the pressurized fluid of the refrigeration system, generate a signal representative of the measured pressure, and transmit the signal representative of the measured pressure.

A coupler and methods of use are described herein. In some embodiments, a coupler for servicing a refrigeration system includes an inlet engageable with a portion of a refrigeration system, a housing coupled to the inlet and a temperature component coupled to the housing. The housing may include a pressure component. The pressure component is configured to measure an in situ pressure of the pressurized fluid of the refrigeration system, generate a signal representative of the measured pressure, and transmit the signal representative of the measured pressure.

A coupler and methods of use are described herein. In some embodiments, a coupler for servicing a refrigeration system includes an inlet engageable with a portion of a refrigeration system, a housing coupled to the inlet and a pressure component coupled to the housing. The housing may include a temperature component. The temperature component is configured to measure an in situ temperature of the pressurized fluid of the refrigeration system, generate a signal representative of the measured temperature, and transmit the signal representative of the measured temperature.

In some embodiments, a coupler for servicing a refrigeration system includes an inlet engageable with a port of a refrigeration system and a set of sensors, and a conduit extending between the inlet and the set of sensors. The conduit allows fluid communication between the refrigeration system and at least one of the sensors. A first sensor of the set of sensors is configured to measure an in situ pressure of a fluid in the refrigeration system. A second sensor of the set of sensors is configured to measure an in situ temperature of the fluid of the refrigeration system, generate a signal representative of the measured temperature, and transmit the signal representative of the measured temperature.

In some embodiments, a coupler for servicing a refrigeration system includes an inlet engageable with a port of a refrigeration system and a set of sensors, and a conduit extending between the inlet and the set of sensors. The conduit allows fluid communication between the refrigeration system and at least one of the sensors. A first sensor of the set of sensors is configured to measure an in situ temperature of a fluid in the refrigeration system. A second sensor of the set of sensors is configured to measure an in situ pressure of the fluid of the refrigeration system, generate a signal representative of the measured pressure, and transmit the signal representative of the measured pressure.

In some embodiments, a system for servicing a refrigeration system includes a coupler and user equipment. The user equipment is in electronic communication with the coupler. The coupler includes an inlet engageable with a portion of the refrigeration system and a housing coupled to the inlet. The housing includes a set of sensors configured to measure in situ at least one physical parameter of the refrigeration system.

In some embodiments, a method of assessing a condition of a refrigeration system includes providing a coupler to a portion of a refrigeration system, the coupler including a set of sensors; obtaining, by at least one sensor in the set of sensors, one or more parameters of the refrigeration system; and transmitting at least one of the parameters to a user equipment. At least one of the parameters is obtained in situ from fluid in the refrigeration system and an assessment of at least one condition of the refrigeration system is generated based on at least one of the parameters.

In some embodiments, a method of servicing a refrigeration system includes providing a coupler to a portion of a refrigeration system, and allowing fluid communication between the refrigeration system and a sensor housing positioned in the coupler and assessing a condition of the refrigeration system based on at least one parameter received from the sensor housing. The sensor housing is operable to measure one or more parameters of the refrigeration system and communicate at least one of the parameters.

In some embodiments, a coupler for servicing a refrigeration system includes an inlet engageable with a portion of a refrigeration system and a set of sensors. A first sensor of the set of sensors is configured to measure an in situ pressure of a fluid in the refrigeration system, generate a signal representative of the measured pressure, and transmit the signal representative of the measured pressure. A second sensor is configured to measure an in situ temperature of the fluid of the refrigeration system, generate a signal representative of the measured temperature, and transmit the signal representative of the measured temperature. The coupler is configured to allow the fluid to flow through the coupler.

In some embodiments, a coupler for servicing a refrigeration system includes an inlet engageable with a portion of a refrigeration system and a set of sensors. A first sensor of the set of sensors is configured to measure an in situ pressure of a fluid in the refrigeration system. A second sensor is configured to measure an in situ temperature of the fluid of the refrigeration system, generate a signal representative of the measured temperature, and transmit the signal representative of the measured temperature. The coupler is configured to allow the fluid to flow through the coupler.

In some embodiments, a coupler for servicing a refrigeration system includes an inlet engageable with a portion of a refrigeration system and a set of sensors. A first sensor of the set of sensors is configured to measure an in situ temperature of a fluid in the refrigeration system. A second sensor is configured to measure an in situ pressure of the fluid of the refrigeration system, generate a signal representative of the measured pressure, and transmit the signal representative of the measured pressure. The coupler is configured to allow the fluid to flow through the coupler.

In further embodiments, features from specific embodiments may be combined with features from other embodiments. For example, features from one embodiment may be combined with features from any of the other embodiments.

In further embodiments, additional features may be added to the specific embodiments described herein.

BRIEF DESCRIPTION OF THE DRAWINGS

Advantages of the present disclosure may become apparent to those skilled in the art with the benefit of the following detailed description and upon reference to the accompanying drawings in which:

FIG. 2A depicts a perspective side cut-away view of an embodiment of a coupler.

FIG. 2B depicts a cross-sectional view of an embodiment of a coupler.

FIG. 2C depicts perspective top view of an embodiment of a coupler.

Figure 1:
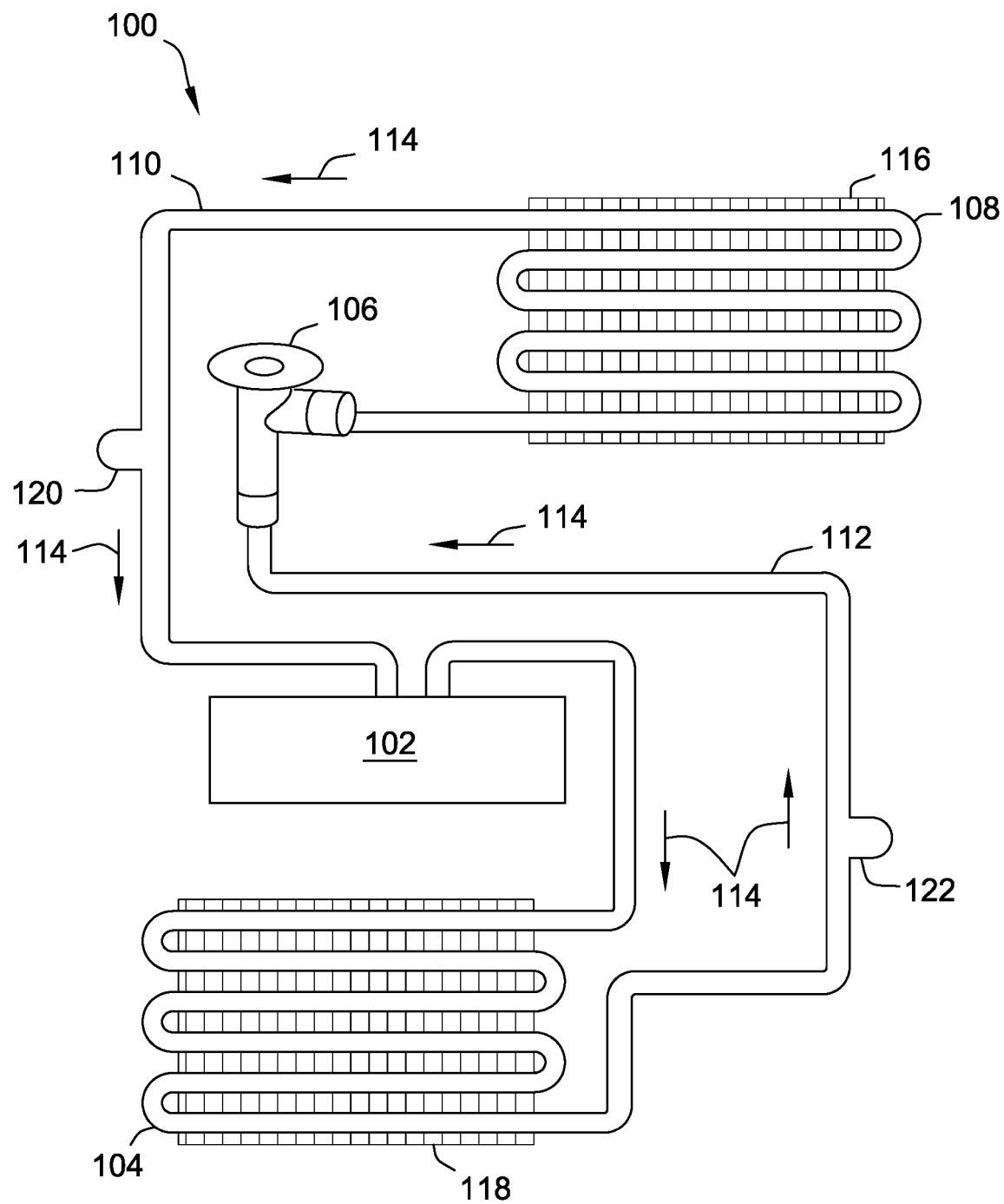
FIG. 1 depicts a schematic illustration of an embodiment of a vapor-compression-refrigerant system.

While the disclosure is susceptible to various modifications and alternative forms, specific embodiments thereof are shown by way of example in the drawings and may herein be described in detail. The drawings may not be to scale. It should be understood, however, that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims.

DETAILED DESCRIPTION OF THE PREFERRED EMBODIMENT

It is to be understood the disclosure is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise.

As used herein "charging" refers to both charging and recharging of a system. Charging a system may include initially filling a unit with fluid. Recharging may refer to adding fluid to a unit that has some fluid in the unit. Recharging may be performed after a portion of the fluid has leaked out of the unit or the pressure/amount of the fluid has dropped below a desirable level. It will be appreciated that charging and recharging are often used interchangeably.

Many of the conventional measuring and charging apparatus utilize hoses or other means of conveyance to direct refrigerant to the measuring devices and may require that pressure and temperature measurements not be taken at the same location in situ, which may result in lower measurement accuracy, loss of refrigerant from the refrigeration system, and potential discharge of the refrigerant that was captured for the measurement into the atmosphere. For example, many prior art apparatus are designed to measure pressure and/or other refrigerant properties as a means for determining charge status use hoses or other means of conveyance to funnel refrigerant to a sensor. The process of measuring in this manner may cause several deleterious effects. First, an amount of refrigerant (usually several ounces) may no longer flow within the refrigeration system, thus indicating a lower charge condition that was induced by the measurement that would not have been present sans the hose set. Secondly, system refrigerant charges have decreased over the years, thus a small loss in charge in the measurement hose can seriously affect overall system response of newer refrigerant systems. Thirdly, refrigerant is a regulated substance and the release of refrigerant into the atmosphere is not allowed. The remaining refrigerant within the measurement hose should be reclaimed; however, many users may not have the equipment to recycle the refrigerant. Thus, refrigerant is typically released into the atmosphere and/or left in the hose.

The couplers and methods of use described herein solve the above-described problems by allowing a sensor in the coupler to be placed in situ with the fluid of the refrigeration system. The couplers provide an inexpensive determination of refrigerant level in the system with no losses of refrigerant to the atmosphere. The couplers and uses thereof also make it possible to obtain pressure and/or temperature readings from a high pressure portion of a refrigeration system.

As used herein "in situ" or "in situ with the fluid" refers to the sensor being at a position in the refrigeration system where the physical properties of the fluid are observed and/or measured, and that the fluid has not been substantially moved to another location. Thus, there is little, or substantially little, variation in the physical properties of the fluid at the time of measurement. For example, a sensor may be placed in the interior of a port connected to the refrigeration system, in the interior of the piping of the refrigeration system, or up to about 5 inches from the interior of the piping of the refrigeration system and experience the same physical parameters (for example, temperature and pressure) as the fluid circulating in the refrigeration system.

In an embodiment, the pressure component, temperature component, or combinations thereof are contained in a housing. In another embodiment, the pressure component, temperature component, or combinations thereof are not contained in a housing and are separated from the pressurized fluid by a membrane.

FIG. 1 depicts a schematic of an embodiment of a vapor-compression-refrigeration system. Vapor compression refrigeration system 100 may include compressor 102, condenser coil 104, expansion device 106, and evaporator coil 108 connected in a serial relationship with refrigerant flow through refrigerant piping 110 and 112 to form a refrigerant flow circuit.

In operation, the refrigerant may include a volume of hydrocarbons, halogenated hydrocarbons, other compressible fluids, and mixtures thereof. In some embodiments, refrigerant may include ammonia and/or water. Halogenated hydrocarbons include, but are not limited to, fluorinated hydrocarbons, chlorinated, fluorinated hydrocarbons, fluorinated ethers, 2,3,3,3-tetrafluorprop-1-ene (HFO-1234yf), 1,1,1,2-tetrafluorethane, dichlorodifluoromethane, or mixtures thereof. Commercially available fluid sources include, but are not limited to, HFO-1234yf refrigerants (for example, Genetron® (Honeywell, USA), Opteon® (DuPont™, USA)), R-134a, R-12, R-22, or the like. In some embodiments, refrigerant may also include other suitable chemicals including, but not limited to, dyes and/or system lubricants.

Fluid circulating through the refrigerant circuit (shown by arrows 114) passes through evaporator coil 108 in the evaporator 116, which is in heat exchange relationship with air being passed over the evaporator coil 108 by a fan (not shown). As the air passes over the evaporator coil 108, the refrigerant absorbs the heat in the air passing over the evaporator coil, thereby cooling the air and evaporating the refrigerant. The fan circulates the cool air into an area designated for cooling.

After evaporation, the refrigerant circuit draws refrigerant vapor to compressor 102. In compressor 102, the refrigerant vapor is pressurized. Hot, high-pressure vapor exits compressor 102 and enters condenser coil 104. Condenser coil 104 is in heat exchange relationship with ambient temperature air passing over the condenser coil by a condenser fan (not shown). As the air passes through the condenser 118 and over the condenser coil 104, the refrigerant rejects heat to the air passing over, thereby heating the air and condensing the high-pressure refrigerant vapor to a high-pressure liquid refrigerant. The high-pressure liquid refrigerant leaving the condenser enters expansion valve 106. Expansion valve 106 expands the high-pressure refrigerant liquid to a lower temperature, lower pressure liquid, (for example, a saturated liquid refrigerant) before it enters evaporator coil 108.

Expansion device 106 may be a valve such as a thermostatic expansion valve (TXV), an electronic expansion valve (EXV), an orifice tube (OT), a variable orifice tube (VOT) or other device designed to expand the fluid refrigerant. Expansion device 106 may regulate the amount of liquid refrigerant entering evaporator coil 116 in response to the superheat condition of the refrigerant exiting evaporator 116. It should be understood that the disclosure is equally applicable for use in association with other refrigerant vapor compression systems such as heat pump systems. In a heat pump system, during cooling mode, the process is identical to that as described herein. In the heating mode of heat pump system, the cycle is reversed with the condenser and evaporator of the cooling mode acting as an evaporator and condenser, respectively.

Vapor compression refrigeration system 100 includes low-pressure port 120 and high-pressure port 122. Low-pressure port 120 is located downstream of evaporator 116 and before compressor 102. High-pressure port 122 is located downstream of condenser 118 and before expansion device 106. Low-pressure port 120 and high-pressure port 122 are both under pressure when refrigeration system 100 contains some level of refrigerant, however, the low-pressure port has a lower pressure than the high-pressure port. In many refrigeration applications, system fluid (refrigerant) is added to the refrigeration system through the low-pressure port 120. In some instances, pressure and/or temperature measurements are obtained by coupling a pressure sensor and/or temperature sensor to low-pressure port 120. These measurements may be used as an indicator to determine a level of fluid in the system, however, the measurements may not be as relevant an indicator for determining fluid level as taking measurements from the high-pressure port 122. In some instances, compressor 102 is a variable compressor and adjustment of the internal pressure of the system may cause variations in pressure and/or temperature measurements obtained from the low-pressure port. In refrigeration systems that have an internal heat exchanger, the pressure on the low-pressure port is increased as compared to pressures of refrigeration systems that do not include an internal heat exchanger. In refrigeration systems that are equipped with TXV or EXV expansion valves, the pressure on the low-pressure port does not reflect charge status except at extreme under charge or over charge conditions as superheat is regulated by the expansion valve.

In some embodiments, a coupler is provided to a portion of a refrigeration system. The coupler may include one or more sensors that measures in situ one or more parameters of the fluid refrigeration system and provides an electronic signal to a processor in user equipment and/or a processor in the coupler. At least one of the sensors is located in situ with the fluid in the refrigeration system. In some embodiments, at least two sensors (for example, a pressure sensor and a temperature sensor) are located in situ with the fluid in the refrigeration system. The processor receives data, and uses the data to assess a condition of the refrigeration system. For example, the processor may calculate a level of fluid in the system, system operating issues, or the like. The assessment of the fluid level may be done by determining the subcooling and/or superheating properties of the fluid in the system and comparing the determined properties to known subcooling or superheating properties for the same fluid. The known properties of various fluids may be stored in a lookup table in the user equipment. The processor and/or user equipment may display data and/or send a communication to an end user that enables or assists a user to diagnosis and/or assess the condition of the refrigeration system.

The coupler for servicing a refrigeration system may include an inlet engageable with a portion (for example, a high-pressure service port or a low-pressure service port) of a refrigeration system and a housing coupled to the inlet. In some embodiments, the inlet may include a quick-disconnect coupler that allows the coupler to be connected to a portion of a refrigeration system (for example, the inlet depicted in FIGS. 2 and 4). In one embodiment, the inlet includes threads and/or components that are complementary to a threads and/or components on a Schrader valve used in Heating Ventilation and Air Conditioning (HVAC) systems (for example, the inlet depicted in FIG. 3).

In some embodiments, the housing is removably coupled to the inlet. A removable housing may allow use of different types of sensors or other electrical components. The housing may include a temperature component, a pressure component, a transceiver and/or an antenna. In some embodiments, one or more sensors are positioned in a body of the coupler.

The temperature component (sensor) may measure a temperature of the pressurized fluid of the refrigeration system, generate a signal representative of the measured temperature, and transmit the signal representative of the measured temperature to user equipment (for example, transmit the signal to a transceiver which transmits the data to the user equipment). The temperature component may be located in situ with the refrigerant in a portion of the refrigeration system. In some embodiments, the temperature component is coupled to the outside surface of the coupler or another portion of the refrigeration system.

The pressure component (sensor) may measure a pressure of the pressurized fluid of the refrigeration system, generate a signal representative of the measured pressure, and transmit the signal representative of the measured pressure to user equipment (for example, transmit the signal to a transceiver which transmits the data to the user equipment). The transmission may be a wireless transmission or through a wired connection. In some embodiments, a short-range wireless signal (for example, at 2400-3483.5 MHz) is transmitted. In some embodiments, the user equipment is a cellular phone. The phone may include one or more applications that receives and processes the data.

The received data may be processed by the user equipment. User equipment includes, but is not limited to, a processor, a cellular phone, a tablet, a computer, a controller, or any device able to receive a communication from the coupler. The processed data may be displayed as pressure measurements, temperature measurements, calculated subcooling and/or superheat values and/or the level (or amount) of fluid in the refrigeration in the refrigeration system. In some embodiments, other received data representative of other in situ physical parameters is processed and displayed.

In some embodiments, the temperature component, pressure component, transceiver, other electronic circuitry or combinations thereof are contained in a sensor housing (for example, a puck). The sensor housing may be positioned in the coupler housing and be in fluid communication with the inlet of the coupler. The sensor housing may include a coupling element that is complementary of a coupling element of the coupler housing member. Providing all the electrical and/or sensor components in a sensor housing allows different sensors to be used in one coupler.

The coupler housing and/or sensor housing may include a power supply. The power supply may be a battery, a rechargeable battery, or the like. For example, the coupler housing may include a recess that holds a battery (for example, a flat battery). In some embodiments, the coupler housing and/or sensor housing include a connector that allows the battery to be recharged. In some embodiments, the battery is removed from the housing, and connected to an electrical supply for charging. In some embodiments, power is supplied to the coupler through a wired connection to a power supply. For example, the coupler may be connected to a user equipment or a power supply through a cable.

In some embodiments, the coupler housing and/or sensor housing includes a sensor that determines a life of the battery. The sensor may transmit one or more signals to user equipment, which processes the signal and displays the life of the battery and/or provides an audio indication that battery life is low. In some embodiments, the sensor provides an audio or visual indication of the life of the battery.

Figure 3:
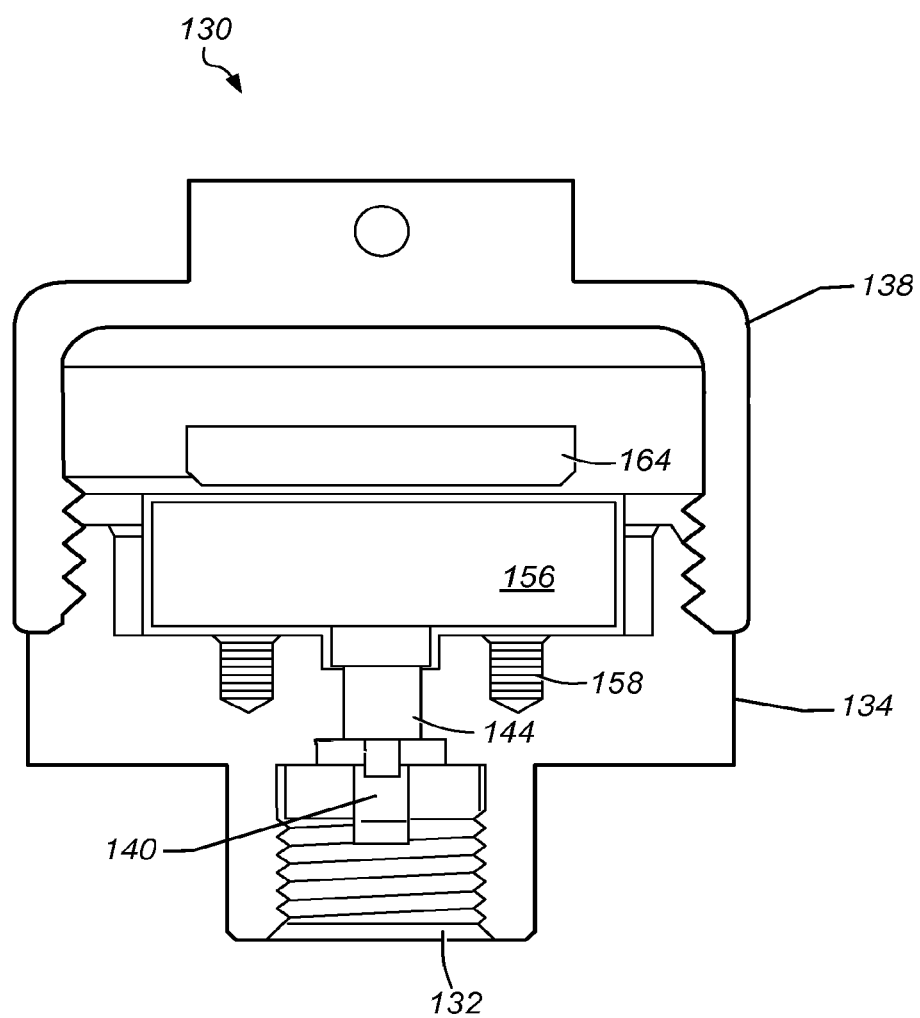
FIG. 3 depicts a cross-sectional view of an embodiment of a coupler with an inlet suitable for use with a heating, ventilation, and air conditioning system.

FIGS. 2A-2C, 3, and 4 depict embodiments of coupler 130 that is useful for obtaining measurements in situ from a refrigeration system. FIG. 2A depicts a perspective side cut-away view of an embodiment of coupler 130. FIG. 2B depicts a cross-sectional view of an embodiment of coupler 130. FIG. 2C depicts perspective top view of an embodiment of coupler 130. FIG. 3 depicts coupler 130 with a inlet suitable for use with a HVAC system. Coupler 130 may include inlet 132, housing 134, coupling element 136, cover 138, plunger 140, and conduit 142. Inlet 132 may allow fluid communication between coupler 130 and a refrigeration system (for example, the refrigeration system depicted in FIG. 1). In some embodiments, inlet 132 is a bore of coupler 130.

In some embodiments, coupler 130 is configured to allow the system fluid to flow through the coupler. Allowing the fluid to flow through the coupler and proximate the sensors allows accurate in situ measurements of the fluid properties and/or the system properties.

Coupler 130 may include plunger 140 that engages a sealing or gating device of portion of a refrigeration line (for example, a low-pressure service port or a high-pressure service port). Plunger 140 may move the sealing device into an open position (for example, moves the seal of a high-pressure port downward). Plunger 140 may be seated in bore 144 of coupler 130. Bore 144 may include a passage that extends from coupler inlet 132 to bore 146 of housing 134 through body 148 of coupler 130. In some embodiments, advancement of coupler 130 onto a port engages plunger 140 with a sealing device and opens the port. In some embodiments, plunger 140 is coupled to, or is a part of, housing 134. For example, plunger 140 may couple to, or be a part of, recess 150 of housing 134. Bore 144 and housing bore 146 may have dimensions suitable to accommodate plunger 140 in coupler 130. In some embodiments, housing bore 146 has a dimension (for example, a diameter) that is smaller than a dimension of coupler bore 144.

Coupler 130 may be coupled to (for example, threaded onto or be a quick disconnect element) a coupling element of a refrigeration system (for example, a service port). In some embodiments, coupling element 136 is selected to be the same size and type as that used with certain service ports of the refrigeration system. For example, coupling element 136 may be complementary to a quick disconnect element (see, inlet 132 in FIGS. 2 and 4) used on a high-pressure port or low-pressure port of a vehicle or a threading complementary to a Schrader valve of a HVAC system (for example, inlet 132 in FIG. 3).

In some embodiments, coupler 130 includes biasing element 152. Biasing element 152 may assist in moving core sleeve 137 under compressive force and then move the core sleeve back to an original position when the compressive force is removed. In some embodiments, biasing element 152 is a spring. In some embodiments, biasing element 152 is not necessary.

Conduit 142 may couple to, or be a part of, a bottom portion of recess 150 of housing 134. For example, conduit may extend from an opening in recess 150. Conduit 142 includes inlet 154. Inlet 154 allows fluid communication between fluid in a refrigeration system and sensor housing 156. Fluid may flow through conduit 142 into the opening in recess 150 of housing 134. Fluid may flow into sensor housing 156 and or circulate around the sensor housing.

Recess 150 of housing 134 may include coupling element (for example, threads) that are complementary of coupling element 158 on sensor housing 156. Seals 162 may inhibit fluid from exiting coupler 130 when coupled to the port of the refrigeration system. Recess 150 may be sized to accommodate sensor housing 156 and/or power supply 164. Power supply 164 may couple to sensor housing 156 or be a part of the sensor housing. Electrical connector 166 may connect power supply 164 with electronic components of sensor housing 156.

Cover 138 couples to housing 134. Fastening member 168 (for example, a screw, pin, or the like) may hold cover 138 in place. In some embodiments, cover 138 friction fits within housing 134. In some embodiments, cover 138 may be equipped with internal threads and couples to housing 134 through such threads (FIG. 3). Cover 138 may include lettering indicating that a battery and/or power supply is inside the coupler.

Figure 4:
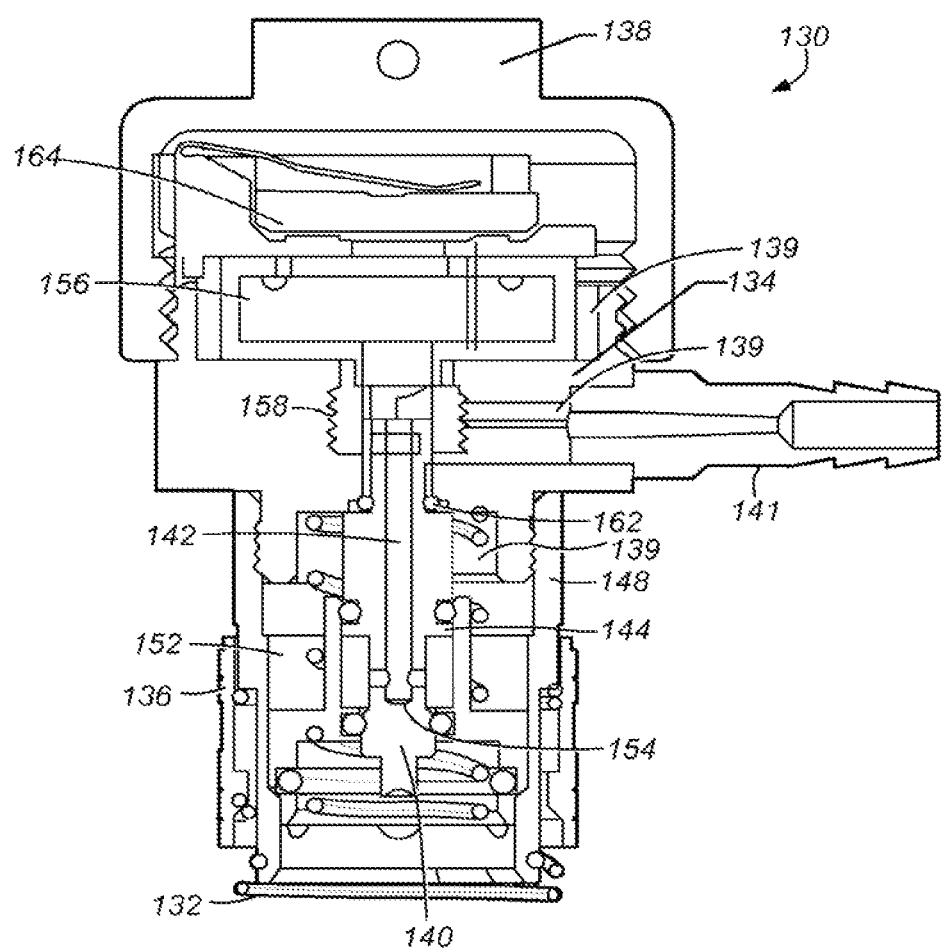
FIG. 4 depicts a cross-sectional view of an embodiment of a coupler that allows fluid to flow through the coupler.

FIG. 4 depicts an embodiment of coupler 130 that allows fluid to flow through the coupler. Coupler 130 includes port 139. Port 139 connects to fluid transfer device 141, which is connected to a fluid source. Port 139 is in fluid communication with fluid transfer device 141 and refrigeration system 100. Such fluid communication allows fluid to be added to the system without removal of the coupler.

Figure 5A:
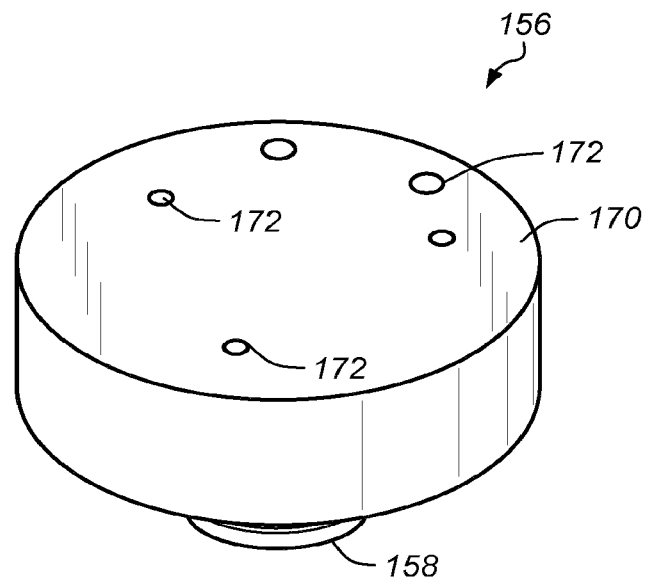
FIG. 5A depicts a perspective top view of an embodiment of a sensor housing.
Figure 5B:
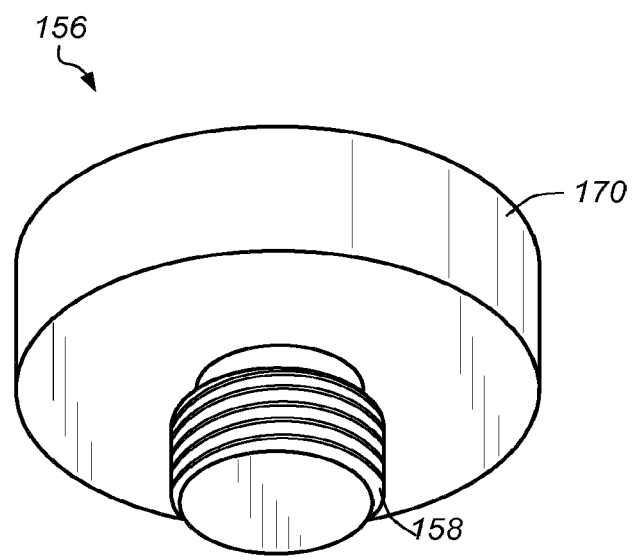
FIG. 5B depicts a perspective bottom view of an embodiment of a sensor housing.

FIGS. 5A and 5B depict perspective views of embodiments of sensor housing 156. FIG. 5A depicts a perspective top view of an embodiment of sensor housing 156. FIG. 5B depicts a perspective bottom view of an embodiment of sensor housing 156. Sensor housing 156 may include body 170 and coupling element 158. Coupling element 158 allows sensor housing 156 to be removed from housing 134 of coupler 130.

Body 170 houses electronic components that allow the capture and transmittal of physical measurements of a refrigeration system. For example, a pressure sensor, temperature sensor, antenna, transmitter, processor, or the like may be housed in body 170. Body 170 may include one or more openings 172 that connect to electronic componentry, or allow for positioning and manufacturing ease, in body 170.

Figure 6A:
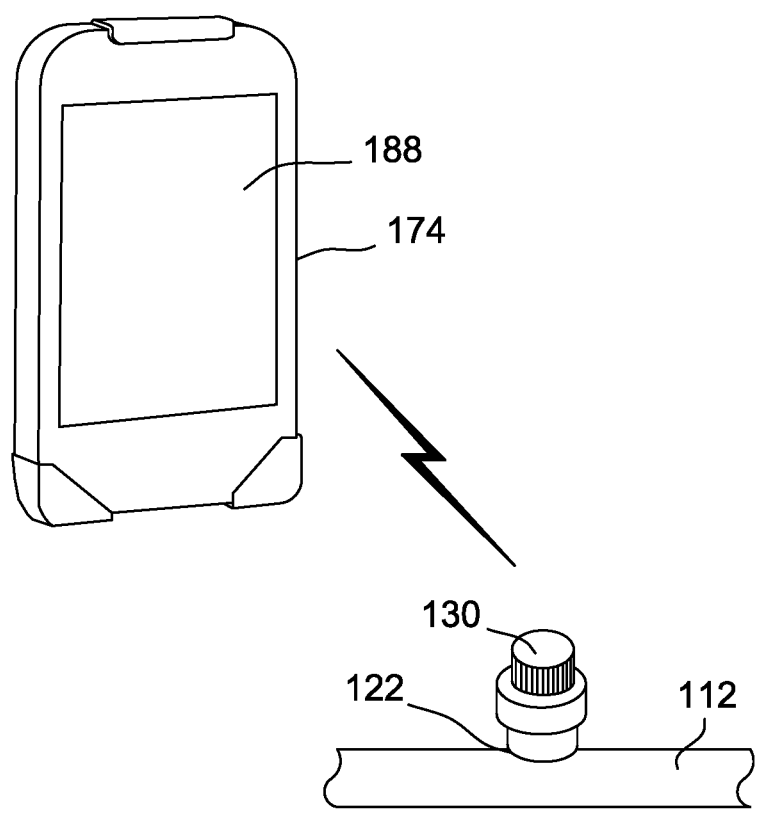
FIGS. 6A and 6B depict embodiments of a coupler coupled to a portion of a refrigeration system and in wireless communication with user equipment.
Figure 6B:
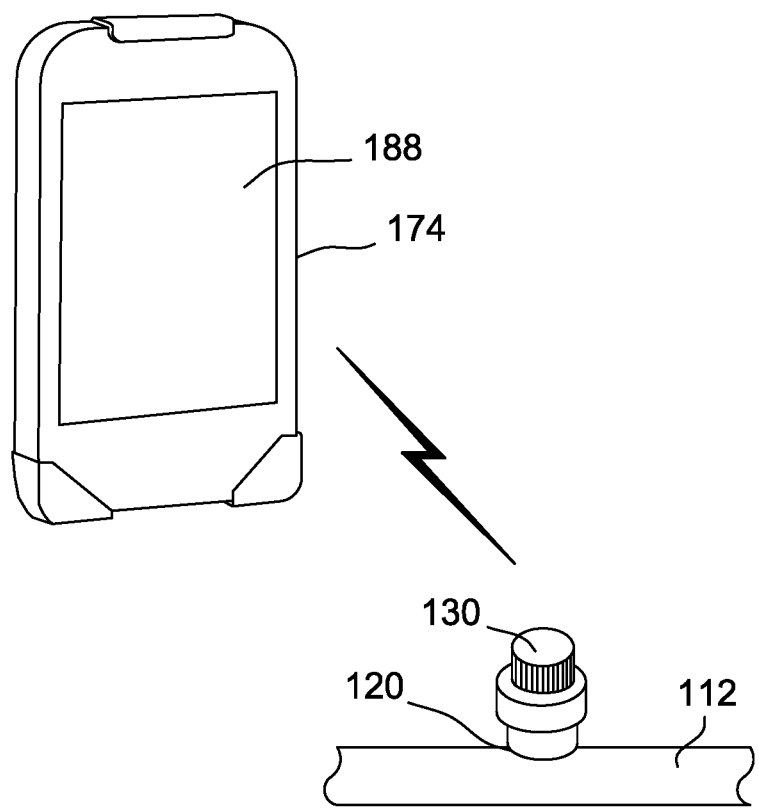
Figure 7:
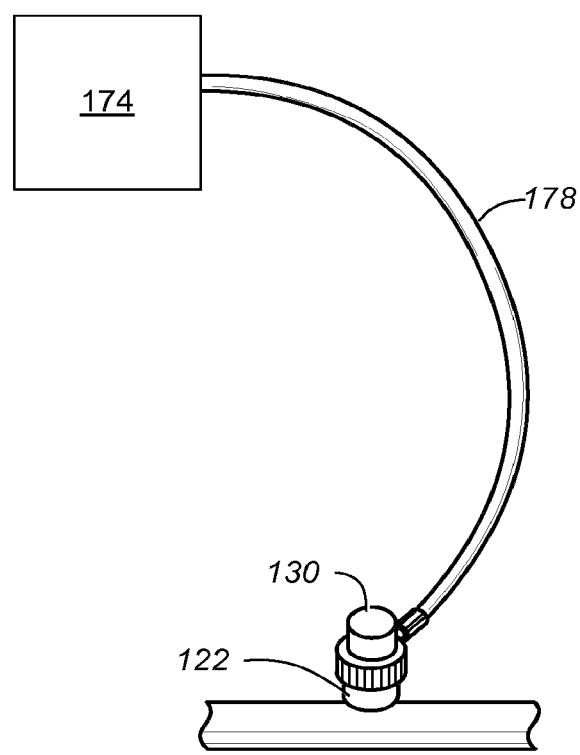
FIG. 7 depicts an embodiment of a coupler directly coupled to a refrigeration system and user equipment.
Figure 8:
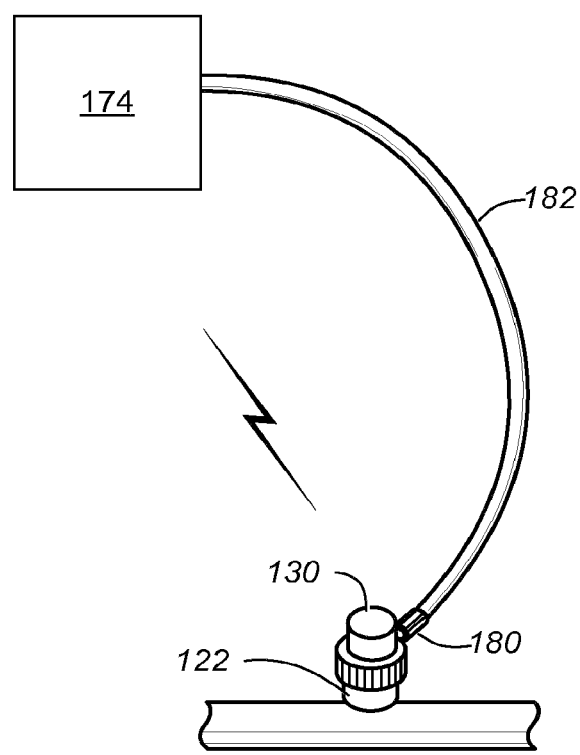
FIG. 8 depicts an embodiment of a coupler coupled to a refrigeration system in wireless communication with user equipment and a temperature component coupled to the refrigeration system and the user equipment.

In some embodiments, coupler 130 is used to determine the physical properties of the refrigeration system and/or a fluid in a refrigeration system. FIGS. 6A and 6B depict embodiments of coupler 130 coupled to a refrigeration system and in wireless communication with user equipment. FIG. 7 depicts an embodiment of coupler 130 directly coupled to a portion of refrigeration system and a user equipment. FIG. 8 depicts the coupler 130 coupled to a refrigeration system in wireless communication with user equipment and a temperature component coupled to the refrigeration system and the user equipment. As shown in FIGS. 6-8, coupler 130 is coupled to high-pressure port 122 of a refrigeration system, however, it is envisioned that the coupler may be coupled to the low-pressure port 120, or another portion of the refrigeration system, as shown in FIG. 6B. Coupler 130 may be coupled to a portion of refrigeration system 100 (shown in FIG. 1). Refrigeration system may be in use (for example, refrigeration is circulating through the fluid piping). A temperature and pressure of the fluid in the refrigerant system may be obtained during operation of the refrigeration cycle. Coupler 130 may electronically transmit the information to user equipment 174. As shown in FIG. 6A, coupler 130 transmits the data to a mobile unit (for example, a tablet or a cellular phone). As shown in FIG. 7, coupler 130 transmits the data through cable 178 to user equipment. In some embodiments, user equipment 174 is used to charge the power supply of coupler 130.

As shown in FIG. 8, temperature component 180 may be coupled to the housing of coupler 130 and to user equipment 174 through cable 182. For example, temperature component may be removably coupled to the coupler or another portion of the refrigeration system. The temperature component may measure the temperature of the skin of the piping of the refrigeration system and transmit a signal representative of that temperature to the user equipment through cable 182. In some embodiments, temperature component 180 is capable of transmitting a wireless signal to user equipment 174.

In some embodiments, user equipment 174 is a cellular phone, a tablet, or any device capable of receiving an electronic communication from coupler 130. User equipment 174 may optionally include a case. The case may optionally include a holding device. The holding device may allow "hands free" use of user equipment 174. "Hands free" use of user equipment 174 may allow a user to service the refrigeration system while determining the physical properties of the system. For example, coupler 130 transmits data to user equipment 174. User equipment 174 displays a fluid level (for example, refrigerant) in the refrigerant system based on the subcooling temperature of the fluid. Based on the assessed fluid level (or amount of fluid) in the system, fluid may be added or removed from the low-pressure port of the refrigerant system while the coupler is attached to the another portion of the refrigeration system (for example, a high-pressure port of the refrigerant system). As the fluid is added or removed through the low-pressure port, user equipment 174 displays a level of fluid in the system in real time. Thus, a more accurate charging of the refrigerant system may be performed as compared to the use of manual gauges and charts, and/or assessing condition of the refrigeration unit using data obtained from the low-pressure side of the refrigeration system.

In some embodiments, user equipment 174 may include one or more applications that processes the data signals received from coupler 130, and displays values obtained by processing the data signals. Screen 188 may display one or more values obtained from the data sent by coupler 130. Screen 188 may a include pressure value, a temperature value, a subcooling reading, and/or one or more graphics representative of the date received from the coupler. For example, a graphic may include pressure indices and text that indicate a level (for example, high, low, or full) of fluid in the system. The graphic may indicate the level of refrigerant in a vapor-compression-refrigeration system based on the in situ subcooling measurements taken at a high-pressure portion of the refrigeration system.

A method of servicing a refrigeration system includes providing coupler 130 to a portion of a refrigeration system (for example, a service port of the refrigeration system). Coupler 130 may be attached onto service port (for example, high-pressure port 122 or low pressure port 120). In some embodiments, user equipment 174 may be coupled to a portion of the vehicle (for example, hung from an inner portion of the hood of a vehicle). In some embodiments, user equipment 174 controls coupler 130. For example, user equipment may power coupler 130 on or off. User equipment 174 may be activated to receive the data obtained from coupler 130. Pressure and temperature data may be received by user equipment 174, processed and displayed on screen 188. In some embodiments, a level refrigerant in the refrigerant system may be assessed by user equipment 174 and displayed on user equipment screen 188. For example, the display may read high, low, or full. The refrigerant level may be deemed acceptable. If the fluid level (refrigerant level) is high or low, system fluid may be removed or added through low-pressure port 120 or another service port while monitoring the fluid level in the system using the data being obtained at another service port (for example, high-pressure port 122). Once it is determined that the level of system fluid is adequate, coupler 130 is decoupled (disconnected) from the service port (for example, disconnected from high-pressure port 122).

In some embodiments, a method of servicing a refrigeration systems includes providing coupler 130 to a port of a refrigeration system. In some embodiments, the coupler and a temperature component are provided to the refrigeration system. The refrigeration system is activated, and fluid is allowed to flow through the refrigeration system and into coupler 130. Fluid may flow into and/or around sensor housing 156. One or more sensors (for example, a set of sensors) in sensor housing 156 may measure one or more parameters of the refrigeration system and generate a signal representative of at least one of the parameters. In some embodiments, a transmitter in coupler 130 and/or sensor housing 156 communicates the signal representative of at least one of the in situ parameters to user equipment 174. In some embodiments, sensors in coupler 130 may transmit signal representative of at least one of the in situ parameter to user equipment 174 through a wired connection. User equipment 174 may determine and display on screen 188 a condition of the refrigeration system (for example, a fluid level in the refrigeration system).

In some embodiments, fluid is charged through coupler 130 after determining a level of system fluid in the system. For example, fluid may be charged through port 141 of coupler 130.

Figure 9:
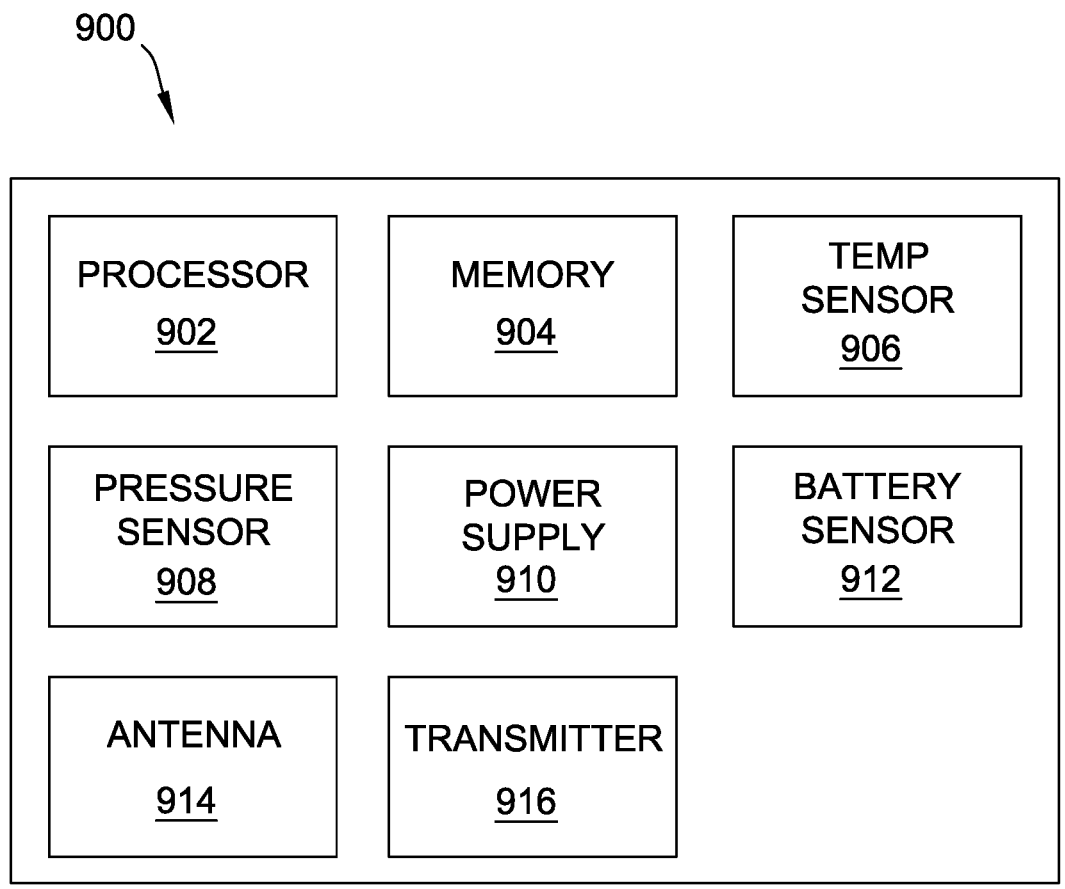
FIG. 9 depicts a block diagram of a coupler coupled to a refrigeration system in accordance with at least one embodiment of the invention.

In some embodiments, a coupler for servicing a refrigeration system includes an inlet engageable with a portion of a refrigeration system, and a housing coupled to the inlet. FIG. 9 illustrates an example of a block diagram of a structure in accordance with at least one embodiment. Structure 900 may be coupler 130, for example. The housing includes a temperature component 906 configured to measure a temperature in situ of a pressurized fluid of the refrigeration system, generate a signal representative of the measured temperature, and transmit the signal representative of the measured temperature; and a pressure component 908 configured to measure a pressure in situ of the pressurized fluid of the refrigeration system, generate a signal representative of the measured pressure, and transmit the signal representative of the measured pressure.

The coupler can further include a transmitter 916 electronically coupled to the temperature component and the pressure component. The transmitter is capable of transmitting a short range wireless signal via antenna 914. The transmitter can be a transceiver.

The housing can further include a power supply 910 in which the power supply is coupled to the temperature component, pressure component, or combinations thereof. The power supply can be a battery. The housing can further include a power supply and a sensor 912 in which the sensor is configured to determine a life of the power supply. The coupler can further include a cover coupled to the housing.

The coupler can further include a conduit that allows fluid communication between the inlet and the refrigeration system. The inlet can be engaged with a portion of the refrigeration system located downstream of a condenser of the refrigeration system. Also, the inlet is engaged with a portion of the refrigeration system located downstream of an evaporator of the refrigeration system.

In some embodiments, the pressure component, temperature component, or combinations thereof are contained in the housing. The housing can include a processor 902 and a memory 904 in which the processor is configured to process signals received from the temperature component and/or the pressure component.

In some embodiments, the refrigeration system is a vehicle refrigeration system. The refrigeration system can be a heating, ventilation, air condition refrigeration system. The refrigeration system can be a commercial refrigeration system. The commercial refrigeration system can be food displays, walk-in freezers and refrigerated trucking.

In some embodiments, a coupler for servicing a refrigeration system includes an inlet engageable with a portion of a refrigeration system; a temperature component to measure a temperature in situ of a pressurized fluid of the refrigeration system, generate a signal representative of the measured temperature, and transmit the signal representative of the measured temperature; and a pressure component configured to measure a pressure in situ of the pressurized fluid of the refrigeration system, generate a signal representative of the measured pressure, and transmit the signal representative of the measured pressure.

The coupler can further include a housing coupled to the inlet. In some embodiments, the pressure component, temperature component, or combinations thereof are not contained in a housing and are separated from the pressurized fluid by a membrane.

In some embodiments, a coupler for servicing a refrigeration system includes an inlet engageable with a port of a refrigeration system; a set of sensors, wherein a first sensor of the set of sensors is configured to measure in situ a pressure of a fluid in the refrigeration system, and wherein a second sensor of the set of sensors is configured to measure in situ a temperature of the fluid of the refrigeration system, generate a signal representative of the measured temperature, and transmit the signal representative of the measured temperature; and a conduit extending between the inlet and the set of sensors, wherein the conduit allows fluid communication between the refrigeration system and at least one of the sensors.

The coupler can further include a housing coupled to the inlet. The housing is removably coupled to the inlet. The set of sensors is contained in a housing. Alternatively, the set of sensors is not contained in a housing and is separated from the fluid by a membrane. The set of sensors can be contained in a housing and the sensor housing includes a coupling element that is complementary to a coupling element of the housing. The set of sensors can be in wired communication with a user equipment. The set of sensors can be in wireless communication with a user equipment.

The housing can further include at least one processor. The housing can further include a transmitter, the transmitter being capable of transmitting a short range wireless signal.

The portion of the refrigeration system can be downstream of an evaporator of the refrigeration system. Alternatively, the portion of the refrigeration system can be downstream of a condenser of the refrigeration system.

In some embodiments, a system for servicing a refrigeration system includes a coupler having an inlet engageable with a portion of a refrigeration system; a housing coupled to the inlet and in fluid communication with the inlet, the housing comprising at least one sensor configured to measure in situ at least one physical parameter of the refrigeration system; and user equipment in electronic communication with the coupler.

In some embodiments, a method of assessing a condition of a refrigeration system includes providing a coupler to a portion of a refrigeration system, wherein the coupler comprises at least one sensor; and user equipment in electronic communication with the coupler; obtaining, by the at least one sensor, one or more parameters of the refrigeration system, wherein at least one of the parameters is obtained in situ from fluid in the refrigeration system; and assessing at least one condition of the refrigeration system based on at least one of the obtained parameters.

In some embodiments, at least one of the parameters includes a temperature of the fluid exiting a condenser of the refrigeration system; at least two of the parameters include a temperature of the fluid exiting a condenser of the refrigeration system and a pressure of the fluid exiting a condenser of the refrigeration system; at least one of the parameters comprises a pressure of the fluid exiting an evaporator of the refrigeration system; at least one of the parameters includes a temperature of the fluid exiting an evaporator of the refrigeration system; or at least two of the parameters includes a temperature of the fluid exiting an evaporator of the refrigeration system and a pressure of the fluid exiting an evaporator of the refrigeration system.

The user equipment can include a computer, a cellular phone, a tablet, or a processor. The assessing can include receiving, by user equipment, data through a short range wireless signal, or receiving, by user equipment, data through a wired connection.

In some embodiments, a method of assessing a condition of a refrigeration system includes providing a coupler to a portion of a refrigeration system; allowing fluid communication between the refrigeration system and a sensor housing positioned in the coupler, wherein the sensor housing is operable to: measure one or more parameters of the refrigeration system; and communicate at least one of the parameters; and assessing a condition of the refrigeration system based on at least one communicated parameter.

The method can further include providing fluid to a second portion of the refrigerant system based on the assessed condition. Also, the method can further include providing fluid to a second portion of the refrigerant system based on the assessed condition of the refrigeration system; and monitoring an amount of fluid in the refrigeration system with the user equipment while providing additional fluid to the refrigeration system.

In some embodiments, a coupler for servicing a refrigeration system includes an inlet engageable with a portion of a refrigeration system; a set of sensors, wherein a first sensor of the set of sensors is configured to measure in situ a pressure of a fluid in the refrigeration system, and wherein a second sensor is configured to measure in situ a temperature of the fluid of the refrigeration system; and a port configured to allow the fluid to flow from a supply source into the refrigerant system.

In some embodiments, a coupler for servicing a refrigeration system includes an inlet engageable with a portion of a refrigeration system; a housing coupled to the inlet, the housing comprising a pressure component configured to measure a pressure in situ of the pressurized fluid of the refrigeration system, generate a signal representative of the measured pressure, and transmit the signal representative of the measured pressure; and a temperature component configured to measure a temperature of the refrigeration system, generate a signal representative of the measured temperature, and transmit the signal representative of the measured temperature.

In some embodiments, a kit for servicing a refrigeration system includes a coupler. The coupler includes one or more sensors able to measure in situ at least one physical parameter of the refrigeration system (for example, temperature and/or pressure). The kit may also include safety glasses, a fluid source (for example, a can or tank of refrigerant), dye and/or other equipment.

The coupler and system of this disclosure are particularly useful for servicing refrigeration systems. Illustrative refrigeration systems include, for example, vehicle refrigeration systems; heating, ventilation, air condition refrigeration systems; commercial refrigeration systems; and the like. Illustrative commercial refrigeration systems include, for example, food displays, walk-in freezers, refrigerated trucking, and the like.

The user equipment, sensor housing, and/or coupler may include a processor that may execute one or more program instructions stored in a memory or a carrier medium coupled to the user equipment, sensor housing, and/or coupler. A non-transitory memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor that connects to the first processor over a network, such as the Internet. In the latter instance, the second processor may provide program instructions to the first processor for execution. The term "memory medium" may include two or more memory mediums that may reside in different locations, e.g., in different computers that are connected over a network.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

What is claimed is:

1. An apparatus for servicing a refrigeration system, the apparatus comprising:
 a body having a first end and a second end, wherein the body defines a passage extending within the body from the first end to the second end, and a recess is formed within the body at the second end, the body comprising:
  an inlet at the first end of the body, the inlet configured to directly engage with a portion of the refrigeration system;
  a conduit positioned in the passage, the conduit in fluid communication with the inlet and extending to the recess at the second end of the body; and
  a plunger positioned in the passage, the plunger configured to allow a fluid from the refrigeration system to flow through the inlet and into the conduit of the body; and
 a housing at least partially positioned in the recess and removably coupled to the second end of the body, the housing in fluid communication with the conduit, the housing comprising:
  a sensor configured to:
   directly contact the fluid;
   measure a parameter of the fluid; and
   generate a signal representative of the measured parameter; and
  a transmitter, communicatively-coupled to the sensor and capable of transmitting short range wireless signals, the transmitter configured to transmit the signal representative of the measured parameter.

2. The apparatus of claim 1, wherein the transmitter is a transceiver.

3. The apparatus of claim 1, wherein the housing further comprises a power supply, the power supply coupled to the sensor.

4. The apparatus of claim 1, wherein the sensor is a temperature sensor configured to measure a temperature of the fluid and generate a signal representative of the measured temperature.

5. The apparatus of claim 1, wherein the housing further comprises a power supply and a power sensor, the power sensor being configured to determine a life of the power supply.

6. The apparatus of claim 1, wherein the refrigeration system includes a compressor, a condenser comprising at least one condenser coil, an expansion device and an evaporator comprising at least one evaporator coil connected in serial relationship via refrigerant piping, wherein the inlet is configured to engage with a portion of the refrigeration system located at each of:
   downstream of the condenser of the refrigeration system and before the expansion device, and
   downstream of the evaporator of the refrigeration system and before the compressor.

7. The apparatus of claim 1, wherein the housing comprises a processor, the processor being configured to process signals received from the sensor.

8. The apparatus of claim 1, wherein the sensor is one of a temperature sensor configured to measure a temperature of the fluid and a pressure sensor configured to measure a pressure of the fluid.

9. The apparatus of claim 1, wherein the body further comprises a coupling element in the recess to receive a coupling member of the housing such that the housing is removably coupled to the body.

10. A system for servicing a refrigeration system, comprising:
   an apparatus, comprising:
      a body having a first end and a second end, wherein the body defines a passage extending within the body from the first end to the second end, and a recess is formed within the body at the second end, the body comprising:
         an inlet at the first end of the body, the inlet configured to directly engage with a portion of the refrigeration system;
         a conduit positioned in the passage, the conduit in fluid communication with the inlet and extending to the recess at the second end of the body; and
         a plunger positioned in the passage, the plunger configured to allow a fluid from the refrigeration system to flow through the inlet and into the conduit of the body; and
      a housing at least partially positioned in the recess and removably coupled to the second end of the body, the housing in fluid communication with the conduit, the housing comprising a sensor configured to directly contact the fluid, measure a parameter of the fluid, generate a signal representative of the measured parameter, and transmit the signal representative of the measured parameter; and
   user equipment in electronic communication with the apparatus.

11. The system of claim 10, wherein the housing further comprises a transmitter electronically coupled to the sensor.

12. The system of claim 10, wherein the sensor is one of a temperature sensor configured to measure a temperature of the fluid and a pressure sensor configured to measure a pressure of the fluid.

13. A method of assessing a condition of a refrigeration system and servicing the refrigeration system, comprising:
   providing an apparatus to a portion of the refrigeration system and user equipment in electronic communication with the apparatus, wherein the apparatus comprises:
      a body having a first end and a second end, wherein the body defines a passage extending within the body from the first end to the second end, and a recess is formed within the body at the second end, the body comprising an inlet at the first end of the body, the inlet configured to directly engage with a portion of the refrigeration system, a conduit positioned in the passage, the conduit in fluid communication with the inlet and extending to the recess at the second end of the body, and a plunger positioned in the passage, the plunger configured to allow a fluid from the refrigeration system to flow through the inlet and into the conduit of the body; and
      a housing comprising at least one sensor, the housing at least partially positioned in the recess and removably coupled to the second end of the body, the housing in fluid communication with the conduit such that the at least one sensor is configured to directly contact the fluid;
   obtaining, by the at least one sensor, one or more parameters of the fluid in direct contact with the at least one sensor; and
   determining at least one condition of the refrigeration system based on the obtained one or more parameters and servicing the refrigeration system based on the at least one condition.

14. The method of claim 13, wherein one of the obtained one or more parameters comprises a temperature of the fluid exiting a condenser of the refrigeration system or a pressure of the fluid exiting a condenser of the refrigeration system.

15. The method of claim 13, wherein one of the obtained one or more parameters comprises a pressure of the fluid exiting an evaporator of the refrigeration system or a temperature of the fluid exiting an evaporator of the refrigeration system.

16. The method of claim 13, wherein the user equipment comprises a computer, a cellular phone, or a tablet.

17. The method of claim 13, further comprising:
   receiving, by the user equipment, data through a short range wireless signal, or receiving, by the user equipment, data through a wired connection.

18. An apparatus for servicing a refrigeration system, the apparatus comprising:
   a body having a first end and a second end, wherein the body defines a passage extending within the body from the first end to the second end, and a recess is formed within the body at the second end, the body comprising:
      an inlet at the first end of the body, the inlet configured to directly engage with a portion of the refrigeration system;
      a conduit positioned in the passage, the conduit in fluid communication with the inlet and extending to the recess at the second end of the body; and
      a plunger positioned in the passage, the plunger configured to allow a fluid from the refrigeration system to flow through the inlet and into the conduit of the body; and
   a housing at least partially positioned in the recess and removably coupled to the second end of the body, the housing in fluid communication with the conduit, the housing comprising:
      a sensor configured to:
         directly contact the fluid;
         measure a parameter of the fluid;
         generate a signal representative of the measured parameter; and
         transmit the signal representative of the measured parameter; and a power supply, wherein the power supply comprises a battery.

19. The apparatus of claim 18, wherein the sensor is one of a temperature sensor configured to measure a temperature of the fluid and a pressure sensor configured to measure a pressure of the fluid.

20. A method of assessing a condition of a refrigeration system and servicing the refrigeration system, comprising:
providing an apparatus to a portion of the refrigeration system and user equipment in electronic communication with the apparatus, wherein the apparatus comprises:
a body having a first end and a second end, wherein the body defines a passage extending within the body from the first end to the second end, and a recess is formed within the body at the second end, the body comprising an inlet at the first end of the body, the inlet configured to directly engage with a portion of the refrigeration system, a conduit positioned in the passage, the conduit in fluid communication with the inlet and extending to the recess at the second end of the body, and a plunger positioned in the passage, the plunger configured to allow a fluid from the refrigeration system to flow through the inlet and into the conduit of the body; and
a housing comprising at least one sensor, the housing at least partially positioned in the recess and removably coupled to the second end of the body, the housing in fluid communication with the conduit such that the at least one sensor is configured to directly contact the fluid, and
wherein the user equipment comprises a computer, a cellular phone, or a tablet;
obtaining, by the at least one sensor, one or more parameters of the fluid in direct contact with the at least one sensor; and
determining at least one condition of the refrigeration system based on the obtained one or more parameters and servicing the refrigeration system based on the at least one condition.

* * * * *